July 1, 1941. H. H. STINNES 2,247,527

SWASH-RING DRIVING MECHANISM

Filed Nov. 10, 1939

Inventor:
Hanns Heinz Stinnes
by [signature] atty.

Patented July 1, 1941

2,247,527

UNITED STATES PATENT OFFICE 2,247,527

SWASH-RING DRIVING MECHANISM

Hanns Heinz Stinnes, Berlin, Germany

Application November 10, 1939, Serial No. 303,916
In Germany November 21, 1938

3 Claims. (Cl. 74—60)

Swash-ring driving mechanisms need rectilinear guide means for a point situated on the swash-ring which is mounted on a rotating oblique disc but does not participate in the rotary motion of the said disc. Such guide means are known per se. Furthermore it is known to substitute for these rectilinear guide means two mutually inclined gear wheel rims in mesh with and rolling on each other.

Both of these known structures have disadvantages. The disadvantage of the rectilinear guide means for a point on a swash-ring is that all other points lying on the same concentric peripheral circle must perform lateral movements of various sizes and consequently the ring does not perform a uniform swash motion, but a three dimensional pendulum motion is developed and the largest lateral motions attain sizes which prevent use of the driving mechanism in some cases, because the lateral motion is determined by the angle of the oblique disc and the diameter of the swash-ring. In addition the rectilinear guide means necessitate an arrangement to prevent them from loading those parts which move to and fro therewith with the lateral pressures which arise from the reaction of the moment of torsion and the friction set up by rotation of the disc in the ring. As the size of the lateral motion increases with the size of the angle of the oblique disc and the size of diameter of the swash-ring, the said rectilinear guide means prevent the driving mechanism from being made compact in the case of a large angle of the oblique plate and a large diameter of the swash-ring. The said rectilinear guide means also affect other structural parts with regard to their dimensions, and thereby greatly narrow the possibilities of use of the mechanism.

When gear wheel rims are used in place of the rectilinear guide means, the high load of the few teeth which mesh with each other at one time is particularly unsatisfactory. Noise is created, particularly when the driving mechanism is used in connection with machines which require sudden increases or reductions in the rate of revolution.

The object of this invention is to avoid these disadvantages. This is attained by providing all of the transmission members, for example swivel blocks, which engage the studs on the swash-ring with such lateral play in the piston cross heads that all transcrosswise of their longitudinal axes that all transmission members, for example swivel blocks, lying on a peripheral circle of the swash-ring which is concentric to the longitudinal axis of the oblique disc perform lateral motions of mutually equal size crosswise of the longitudinal axis of the piston.

By the construction in accordance with the invention the swash-ring is given to some extent a floating guidance and there is a complete absence of special rectilinear guidance of the swash-ring in a plane. By correspondingly forming all the transmission members of the swash-ring the lateral motion towards each side is reduced to one quarter of that total lateral motion of a stud which would occur, in the case of the guidance of a swash-ring in a plane, assuming the disc angle and ring diameter to be the same and the said stud to be displaced 90° from the stud which is guided rectilinearly. Furthermore all points on a concentric peripheral circle on the swash-ring describe together exactly similar paths in all directions. The swash-ring therefore performs a completely uniform swash motion. In addition to the simplification of balancing and the decrease in lateral motion which is attained by the invention, there is a substantial reduction in the losses by internal friction of the driving mechanism and therefore an increase in the mechanical efficiency thereof. The individual transmission members can be made stronger without requiring more room because the clearance which was required for the large lateral motion can be utilized to provide a supporting bearing surface.

The invention is illustrated diagrammatically in the drawing by means of a constructional example.

In the drawing—

Figure 1:
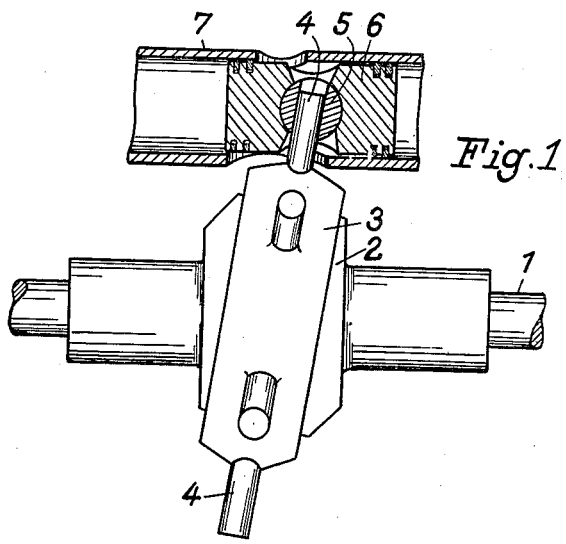
Figure 1 is a side view, partly in longitudinal section of parts of a driving mechanism.

Referring to the drawing, in the construction shown therein, the oblique disc 2 is secured to the shaft 1 of the driving mechanism in the usual manner, and has the swash-ring 3 mounted on it. The disc 2 is easily rotatable in the swash-ring 3 which carries radial swash-ring studs 4. The transmission members, for example the swivel blocks 5, are mounted on the swash-ring studs 4 and produce the power transmission between the swash-ring studs 4 and the piston cross heads 6. The piston cross heads 6 move to and fro in the stationary cylinders 7 the longitudinal axes of which are arranged parallel with the axis of the shaft 1. The rotary motion of the shaft 1 is translated into to and fro motions of the piston cross heads 6, or the to and fro motions of the piston cross heads 6 are translated into a rotary motion of the shaft 1, in the known way.

Figure 2:
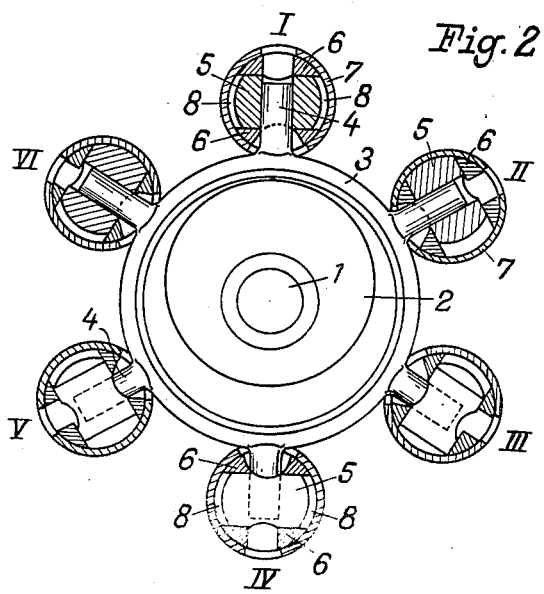
Figure 2 is a view in cross-section of the said parts.

The swivel blocks 5 have the form of solid cylinders as can be seen from the drawing. According to the invention these solid cylinders have play in the hollow cylindrical holes in the piston cross heads 6, the said play being lateral and cross wise of the longitudinal axes of the piston cross heads 6. In Figure 2, those two swivel blocks 5 in the cylinders 7 which are located at I and IV are in the mid-position. Consequently a similar clearance 8 is present at each end of these swivel blocks 5 up to the inner wall of the cylinders 7. According to a particular constructional example of the invention the clearance is so dimensioned that at each end it is equal to one quarter of that total lateral motion which would occur, in the known rectilinear guidance of a point of the swash-ring, for a stud which was displaced 90° relative to the rectilinearly guide stud. This total lateral motion in known swash-ring drives can be ascertained graphically or by calculation. The swivel block 5 itself has free movement in both endwise directions in the piston 6 and therefore, on rotation of the rotary parts of the driving mechanism, can slide into abutment with the cylinder wall and thereby position the ring 3 until, on continued rotation, the next swivel block 5, due to its angular position relative to the oblique disc, comes into abutment and which again transfers the abutment to the third swivel block after corresponding further rotation, and so forth, until, after a rotation of 360°, all the swivel blocks have abutted successively and the first again comes to abutment. In Figure 2, those places at which an abutment of the ends of the swivel blocks 5 takes place against the inner wall of the cylinders 7 are visible. One swivel block after the other transfers asymtotically the abutment against the cylinder wall, and withdraws again after transference of abutment to the succeeding one. This process takes place at both sides of the cylinder wall and therefore no back swing occurs and in such a way that the cylinder axis represents the abscissae axis of a lemniscate, whilst the cylinder walls are tangents at the points of reversal of the lemniscate along which the swivel block travels.

The ring 3, which, due to the friction of the oblique disc 2 rotating within it, strives to rotate with the said disc, is therefore always supported by the swivel blocks 5 and cylinders 7 in that position in which it momentarily has the largest lateral displacement. The guidance is thus a progressive transitory one which does not stress the pistons 6 laterally and which occurs without the provision of a special appliance for producing this guidance.

Because each swivel block 5 has abutment in the cylinder 7 for only one segment of rotation and then withddraws, the surface in the cylinder 7 against which abutment takes place is repeatedly moistened with fresh lubricant, and therefore a continuous change of lubricant is attained which, together with the withdrawal of the swivel block, makes wear of the abutting surface 5 infinitesimal.

According to the invention, the swash-ring floats between a plurality of points and so positions itself that all points perform a completely uniform swash motion.

The invention is illustrated in the shown constructional example with cylindrical swivel blocks. Other transmission members can however be employed in place of the cylindrical swivel blocks. For example swash-ring studs which are spherically shaped at their outer ends and operate with ball-joint shells can be employed, these ball-joint shells being slidable in the swivel blocks.

In another constructional example of the invention, the cylinder has an aperture at those places where the transmission member, for example the swivel block, abuts when performing its lateral throw, the swivel block being arranged to project through the apertures and abuts against another, stationary structural part outside the cylinder and is guided by the said structural part. The structural part can be a rail or the casing which carries the cylinders.

The ends of the transmission members, for example swivel blocks 5, are so formed that in the lateral end positions, they conform to the structural part, for example the inner wall of the cylinder 7, which restricts the lateral motion.

I claim—

1. A swash-ring driving mechanism comprising a rotary oblique disc, a swash-ring rotatably mounted thereon, studs projecting from the ring, stationary cylinders arranged around the swash-ring with their axes parallel with the axis of rotation of the disc, pistons in the cylinders, cross heads on the pistons, transmission members provided on the studs all having lateral play in the cross heads all transmitting power between the studs and pistons, stationary abutment surfaces with which all the transmission members successively abut for determining the lateral play of the transmission members and diminishing the said lateral play in each direction from the central position of the transmission members to one-fourth of those total lateral movements which were produced by a stud which were displaced 90° relative to a rectilinear guided stud in a swash-ring driving mechanism which would have the same swash disc angle and ring diameter if there were a master stud provided with rectilinear guidance.

2. A swash-ring driving mechanism as defined in claim 1 wherein the transmission members are provided in open-ended apertures in the cross heads and perform sliding movements in the said apertures laterally of the rotary axis of the swash disk, the stationary abutment surfaces for restricting the extent of the lateral sliding movements of the power transmission members being performed by the inner walls of the cylinders.

3. A swash-ring driving mechanism as defined in claim 1 wherein the stationary abutment surfaces against which the extremities of the power transmission members strike at the ends of their sliding movements are of complementary form with said extremities for interfitting.

HANNS HEINZ STINNES.